(12) United States Patent
Panagotacos et al.

(10) Patent No.: US 8,534,901 B2
(45) Date of Patent: Sep. 17, 2013

(54) COLLIMATING WAVEGUIDE APPARATUS AND METHOD

(75) Inventors: George W. Panagotacos, Corona, CA (US); David G. Pelka, Los Angeles, CA (US); Blair L Unger, Rochester, NY (US)

(73) Assignee: Teledyne Reynolds, Inc., Thousand Oaks, CA (US)

( * ) Notice: Subject to any disclaimer, the term of this patent is extended or adjusted under 35 U.S.C. 154(b) by 68 days.

(21) Appl. No.: 12/880,876

(22) Filed: Sep. 13, 2010

(65) Prior Publication Data

US 2012/0063166 A1   Mar. 15, 2012

(51) Int. Cl.
   *F21V 7/04*   (2006.01)
(52) U.S. Cl.
   USPC ........... 362/625; 362/623; 362/628; 362/621; 362/615
(58) Field of Classification Search
   USPC .................. 362/615, 623–626, 628, 559–561
   See application file for complete search history.

(56) References Cited

U.S. PATENT DOCUMENTS

| | | | |
|---|---|---|---|
| 4,337,759 A | 7/1982 | Popovich et al. | |
| 5,404,869 A | 4/1995 | Parkyn, Jr. et al. | |
| 5,577,493 A | 11/1996 | Parkyn, Jr. et al. | |
| 5,655,832 A | 8/1997 | Pelka et al. | |
| 6,524,647 B1 | 2/2003 | Varanasi et al. | |
| 6,527,411 B1 | 3/2003 | Sayers | |
| 6,560,038 B1 | 5/2003 | Parkyn, Jr. et al. | |
| 6,814,470 B2 | 11/2004 | Rizkin et al. | |
| 6,846,099 B2 | 1/2005 | Dubin et al. | |
| 6,871,982 B2 | 3/2005 | Holman et al. | |
| 6,886,963 B2 | 5/2005 | Lodhie | |
| 7,056,001 B2 * | 6/2006 | Chuang | 362/561 |

(Continued)

FOREIGN PATENT DOCUMENTS

| | | |
|---|---|---|
| EP | 0107480 A2 | 5/1984 |
| EP | 0557775 A1 | 9/1993 |
| WO | WO 02/097324 A1 | 12/2002 |
| WO | WO 2008/037940 A1 | 4/2008 |

OTHER PUBLICATIONS

Chang et al., "Ultra-thin Backlight Module with Integrated Light Guide Film", Mechanical and System Research Laboratories, Industrial Technology Research Institute, Taiwan, Republic of China, FMCp-17, IDW '06, 2006, pp. 961-964.

(Continued)

*Primary Examiner* — David J Makiya
*Assistant Examiner* — Bryon T Gyllstrom
(74) *Attorney, Agent, or Firm* — K&L Gates LLP

(57) ABSTRACT

A collimating waveguide, an optical backlight apparatus, and a method of producing a collimated beam of radiant electromagnetic energy are disclosed. A collimating waveguide comprises an input surface to receive radiant electromagnetic energy from a point source and an output surface to emit an output beam of substantially collimated radiant electromagnetic energy. A first collimating surface of the waveguide receives a beam of the radiant electromagnetic energy entering from the input surface traveling in a first direction and reflects the radiant electromagnetic energy into a substantially collimated beam of radiant electromagnetic energy traveling in a second direction, which is the reverse of the first direction. A second collimating surface of the waveguide receives the substantially collimated beam of radiant electromagnetic energy and to redirect the substantially collimated beam toward the output surface. An optical backlight apparatus comprises a reflective cavity to receive the collimating waveguide and a diffuser located over the output surface of the collimating waveguide.

34 Claims, 14 Drawing Sheets

(56) References Cited

U.S. PATENT DOCUMENTS

| | | | |
|---|---|---|---|
| 7,059,731 B2 | 6/2006 | Lee et al. | |
| 7,073,933 B2 * | 7/2006 | Gotoh et al. | 362/624 |
| 7,129,652 B2 | 10/2006 | Patel et al. | |
| 7,172,319 B2 | 2/2007 | Holder et al. | |
| 7,233,115 B2 | 6/2007 | Lys | |
| 7,267,787 B2 | 9/2007 | Dong et al. | |
| 7,297,902 B2 | 11/2007 | Weiss | |
| 7,364,343 B2 * | 4/2008 | Keuper et al. | 362/628 |
| 7,521,872 B2 | 4/2009 | Bruning | |
| 7,522,809 B2 * | 4/2009 | Yamashita et al. | 385/146 |
| 7,567,067 B2 | 7/2009 | Lee et al. | |
| 7,569,996 B2 | 8/2009 | Holmes et al. | |
| 7,572,045 B2 * | 8/2009 | Hoelen et al. | 362/628 |
| 7,585,098 B2 * | 9/2009 | Mikami | 362/608 |
| 7,663,152 B2 | 2/2010 | Bierhuizen et al. | |
| 7,670,021 B2 | 3/2010 | Chou | |
| 7,671,529 B2 | 3/2010 | Mueller et al. | |
| 7,682,850 B2 | 3/2010 | Harbers et al. | |
| 7,703,943 B2 | 4/2010 | Li et al. | |
| 7,717,594 B2 | 5/2010 | Clark | |
| 7,737,636 B2 | 6/2010 | Li et al. | |
| 7,758,223 B2 | 7/2010 | Osawa et al. | |
| 7,768,754 B2 | 8/2010 | Collins, III et al. | |
| 7,798,667 B2 | 9/2010 | Klipstein | |
| 7,830,434 B2 | 11/2010 | Li et al. | |
| 7,845,839 B2 | 12/2010 | Collier | |
| 7,863,641 B2 | 1/2011 | Dahm | |
| 7,915,627 B2 | 3/2011 | Li | |
| 7,970,246 B2 * | 6/2011 | Travis et al. | 385/43 |
| 7,972,030 B2 | 7/2011 | Li | |
| 8,067,884 B2 | 11/2011 | Li | |
| 8,083,384 B2 | 12/2011 | Panagotacos et al. | |
| 8,143,769 B2 | 3/2012 | Li | |
| 8,203,260 B2 | 6/2012 | Li et al. | |
| 8,227,269 B2 | 7/2012 | Chen et al. | |
| 8,227,276 B2 | 7/2012 | Melman | |
| 2003/0031028 A1 | 2/2003 | Murray et al. | |
| 2004/0019665 A1 | 1/2004 | Liang et al. | |
| 2006/0002110 A1 | 1/2006 | Dowling et al. | |
| 2006/0114690 A1 * | 6/2006 | Iki et al. | 362/612 |
| 2007/0211449 A1 * | 9/2007 | Holman et al. | 362/19 |
| 2007/0269611 A1 | 11/2007 | Xiang et al. | |
| 2008/0029720 A1 | 2/2008 | Li | |
| 2008/0137373 A1 * | 6/2008 | Li | 362/620 |
| 2008/0192458 A1 | 8/2008 | Li | |
| 2008/0278460 A1 | 11/2008 | Arnett et al. | |
| 2009/0015753 A1 * | 1/2009 | Ye | 349/64 |
| 2009/0117672 A1 | 5/2009 | Caruso et al. | |
| 2009/0134414 A1 | 5/2009 | Li et al. | |
| 2009/0185107 A1 | 7/2009 | Panagotacos et al. | |
| 2009/0224652 A1 | 9/2009 | Li et al. | |
| 2009/0225560 A1 | 9/2009 | Mukai et al. | |
| 2009/0262516 A1 | 10/2009 | Li | |
| 2009/0283713 A1 | 11/2009 | Sapienza et al. | |
| 2010/0052560 A1 | 3/2010 | Li et al. | |
| 2010/0067217 A1 | 3/2010 | Li | |
| 2010/0164346 A1 | 7/2010 | Li et al. | |
| 2010/0181582 A1 | 7/2010 | Li et al. | |
| 2010/0188839 A1 | 7/2010 | Li | |
| 2010/0188867 A1 | 7/2010 | Li | |
| 2010/0195338 A1 | 8/2010 | Panagotacos et al. | |
| 2010/0237760 A1 | 9/2010 | Yang | |
| 2010/0295070 A1 | 11/2010 | Su et al. | |
| 2010/0295077 A1 | 11/2010 | Melman | |
| 2010/0321919 A1 | 12/2010 | Yang | |
| 2012/0281389 A1 | 11/2012 | Panagotacos et al. | |

OTHER PUBLICATIONS

Feng et al., "Novel Integrated Light-Guide Plates for Liquid Crystal Display Backlight", Institute of Physics Publishing, Journal of Optics A: Pure and Applied Optics, 7, 2005, pp. 111-117.

Kurata et al., "Sheetless Backlight System for Mobile Phone", OMRON Corporation, Kyoto, Japan, FMC7-4, IDW '06, 2006, pp. 1727-1730.

Nagasawa et al., "A Slim and Bendable Backlight System Manufactured by a Roll-to-Roll Continuous Process", Technology Research Association for Advanced Display Materials (TRADIM), Tokyo, Japan, FMCp-13, IDW '06, 2006, pp. 945-948.

Nagasawa et al., "A Novel Backlight System with the Unified Component", Technology Research Association for Advanced Display Materials (TRADIM), Tokyo, Japan, FMC8-4, IDW/AD '05, 2005, pp. 1285-1288.

Nagasawa, Atsushi and Katsuya Fujisawa, "P-175L: Late-News Poster: An Ultra Slim Backlight System Using Optical-Patterned Film", SID 05 Digest, 2005, pp. 570-573.

Pelka et al., "An Overview of LED Applications for General Illumination", (Conference Proceedings Paper), SPIE vol. 5816, Nov. 2003, pp. 15-26.

Pelka, David, "Keen Forms of Kinoforms—Kinoform-based Diffusers Help Lighting Designers Leverage Unique LED Advantages", OE Magazine, SPIE Newsroom, vol. 3, No. 10, Oct. 2003, 3 pages, printed on Jan. 28, 2010 from http://spie.org/x17721.xml?pf=true&highlight=x2408&ArticleID=x17721.

U.S. Appl. No. 12/545,540, filed Aug. 21, 2009, 44 pages.

Winston et al., "Nonimaging Optics", Elsevier Books Academic Press, Burlington, MA, USA, Jan. 5, 2005.

International Search Report for International Application No. PCT/US2011/051238 mailed Dec. 28, 2011.

Written Opinion of the International Searching Authority for International Application No. PCT/US2011/051238 mailed Dec. 28, 2011.

U.S. Appl. No. 13/426,410, filed Mar. 21, 2012.

Holonyak, Nick and S.F. Bevacqua, "Coherent (Visible) Light Emission from Ga(As1—xPx) Junctions", published by the American Institute of Physics, Appl. Phys. Lett., 1, 82, 1962, pp. 82-83.

Yamada et al., "Red-Enhanced White-Light-Emitting Diode Using a New Red Phosphor", Japan J. App. Phys., 2003, pp. L20-L23.

Nakamura et al., "Superbright Green InGaN Single-Quantum-Well-Structure Light-Emitting Diodes", Jpn. J. Appl. Phys., 34, 1995, pp. L1332-L1335.

Narukawa et al., "Recent Progress of High Efficiency Light LEDs", Phys. Stat. Sol., 204, No. 6, 2007, pp. 2087-2093.

Narukawa, Yukio, "White Light-LEDs", Optics & Photonics News, Apr. 2004, pp. 25-29.

Pelka, David and Kavita Patel, "An Overview of LED Applications for General Illumination", (Conference Proceedings Paper), SPIE vol. 5186, Nov. 2003, pp. 15-26.

Float Glass Quality Specification, Building Products, Issue Date Mar. 9, 2006, Pilkington, pp. 1-18.

Pilkington TEC Glass for the Refrigeration Market, Pilkington, 2002, 4 pages.

\* cited by examiner

COLLIMATING WAVEGUIDE APPARATUS AND METHOD

BACKGROUND

Common liquid crystal display (LCD) architectures employ the use of a backlight unit located behind the LCD pixels to provide an illuminated image. The backlight unit illuminates the LCD from the backside and allows the image to be viewed in small and large displays in low light or even bright sunlight conditions by improving the brightness and contrast ratio of the LCD display. LCD Backlights can be full color or monochrome. Color LCD displays such as those used for LCD television or LCD computer monitors generally use white backlights to cover most of the color spectrum. Previously, these backlights employed miniature fluorescent tubes as their light source, more recently these backlight units employ light emitting diodes (LEDs) as their preferred light source.

All twisted nematic (TN) and super twisted nematic (STN) LCDs suffer from poor performance at wide viewing angles due to the optical characteristics of TN and STN liquid crystal materials. The well-known phenomena of color shift and decreased contrast are due to the difference in optical path length through the liquid crystal (LC) material of light rays viewed at high angles versus that of light rays viewed at near normal angles. LCD designers have tried to overcome this problem by careful choice of LC material and by utilizing various LCD modifications.

Large area backlight systems are used in a variety of display systems including laptop or notebook computer systems, large screen LCD TV screens, sunlight readable avionic/automotive displays, air traffic control displays, and medical display systems, to mention a few. Systems such as commercial aircraft cockpit displays and automotive displays including global positioning systems (GPS) navigation systems require extremely bright backlit LCD displays and the ability to direct the output light into an asymmetric field-of-view, as for a pilot and co-pilot LCD displays and to a lesser extent for automotive GPS displays.

Most conventional backlight units incorporate a brightness enhancement film (BEF). The BEF are otherwise known as prism sheets and are made by forming a prism pattern on an optical substrate film. The BEFs serve to concentrate light toward the output side of a backlight, when they are incorporated onto the front surface of that backlight. The prism sheet is, in essence, a film for boosting brightness levels while keeping the power consumed a constant. The BEF film recycles the Lambertian light from the waveguide/diffuser system which is not accepted into the prism film output which collimates the light into an angular field of view of approximately ±23°. This type of optical system limits the ability to collimate the field of view and to use micro lens film arrays or holographic diffuser films on the output side of the LCD display because light has to be collimated to approximately +/−10° to use these field-of-view conditioning films on the exit aperture. In addition, conventional backlight units which incorporate recycling films such as BEF produce secondary light output emissions in the viewing field of 65° to 70°. This can cause unwanted light to enter many optical systems causing additional complexity in the overall optical system design.

SUMMARY

Various embodiments provide a collimating waveguide, an optical backlight apparatus, and a method of producing a collimated beam of radiant electromagnetic energy. In one embodiment, a collimating waveguide comprises an input surface to receive radiant electromagnetic energy from a point source and an output surface to emit an output beam of substantially collimated radiant electromagnetic energy. A first collimating surface of the waveguide receives a beam of the radiant electromagnetic energy entering from the input surface traveling in a first direction and reflects the radiant electromagnetic energy into a substantially collimated beam of radiant electromagnetic energy traveling in a second direction, which is the reverse of the first direction. A second collimating surface of the waveguide receives the substantially collimated beam of radiant electromagnetic energy and to redirect the substantially collimated beam toward the output surface.

FIGURES

The patent or application file contains at least one drawing executed in color. Copies of this patent or patent application publication with color drawing(s) will be provided by the Office upon request and payment of the necessary fee.

DESCRIPTION

Figure 1:
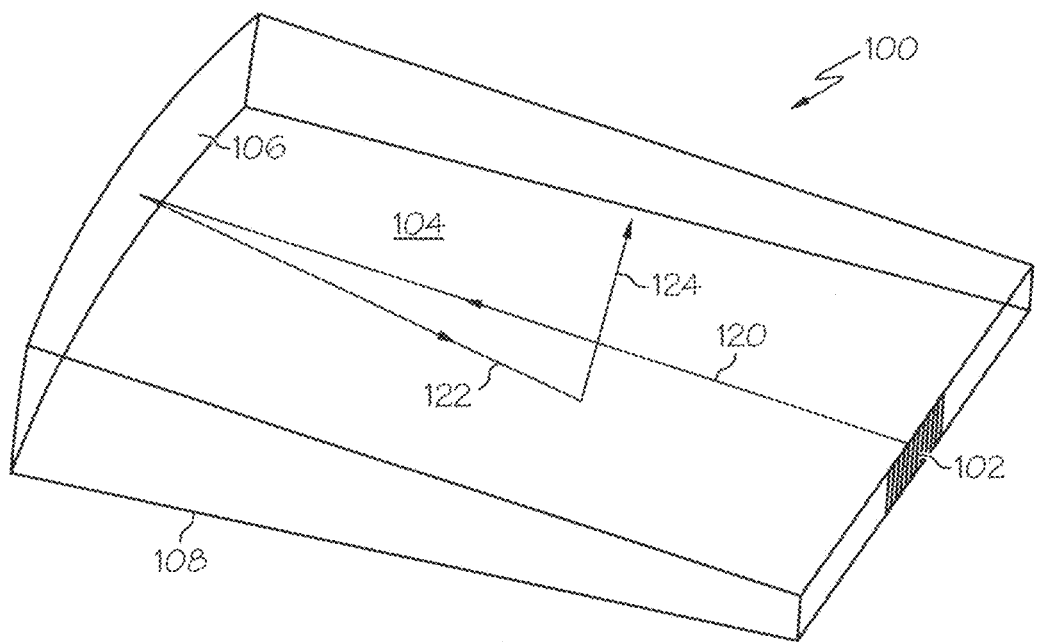
FIG. 1 is a perspective view of one embodiment of a collimating waveguide.

Before explaining the various embodiments in detail, it should be noted that the embodiments are not limited in their application or use to the details of construction and arrangement of elements illustrated in the accompanying drawings and description. The illustrative embodiments may be implemented or incorporated in other embodiments, variations and modifications, and may be practiced or carried out in various techniques. Features or elements described with respect to one embodiment may be incorporated in other embodiments. Embodiments and configurations of the collimating waveguide and collimating backlight apparatus disclosed herein are illustrative only and not meant to limit the scope or application thereof. Furthermore, unless otherwise indicated, the terms and expressions employed herein have been chosen for the purpose of describing the illustrative embodiments for the convenience of the reader and are not to limit the scope thereof.

As used herein the term radiant electromagnetic energy refers to light of wavelengths in the visible and invisible spectrum including light of wavelengths ranging from ultraviolet to infrared wavelengths. The terms optics and/or optical refers generally to the behavior of light in the visible and invisible spectrum from the ultraviolet to the infrared wavelengths. Because light is an electromagnetic wave, other forms of electromagnetic radiation such as X-rays, microwaves, and radio waves exhibit similar properties. Accordingly, the term radiant electromagnetic energy is not necessarily limited to light and is intended to encompass other forms of electromagnetic radiation such as X-rays, microwaves, and radio waves.

In one general aspect, the disclosed embodiments provide a new principle of operation for LCDs that solves the problem externally to the LCD device rather than internally to the LCD. In one aspect, providing sufficiently collimated light (less than about +/−10°) to the TN or STN LCD will result in high contrast and an absence of color shift. Since most applications demand wider viewing angles, a diffusing screen is provided to spread out the collimated beam after it has passed through the LC cell. This viewing screen should have high efficiency and low back scatter of ambient light in order to maintain the high contrast. In various embodiments, thin film micro-lens arrays and holographic diffusers are particularly good choices to meet these requirements. Additionally, the highly collimated light is provided in a sufficiently thin backlight unit so as to preserve the overall package thinness, which is one of the most attractive features of such displays. Fabricating these two elements in a thin and efficient format provides a solution to color and contrast shift with viewing angle that is external to the LCD cell. This will result in significantly improved and simplified LCDs for use in many applications such as LCD TVs, notebook computers, auto navigation and avionic displays.

In one general aspect, the disclosed embodiments are directed to collimating waveguides, collimating optical backlights, and methods of producing a collimated beam of radiant electromagnetic energy using the various embodiments of the collimating waveguides and collimating optical backlights disclosed herein. In one embodiment, the collimating waveguide incorporates an optical double-pass design utilizing a single optical component having minimal thickness and weight. Radiant electromagnetic energy is received by an input surface and travels in a first direction. The radiant electromagnetic energy is reflected by a second surface that collimates the radiant electromagnetic energy rays as they travel in a second direction, which is the reverse of the first direction. The collimated radiant electromagnetic energy traveling in the reverse direction is redirected by a third surface, which collimates and out-couples the radiant electromagnetic energy to an output surface at a substantially normal angle to the output surface. In one embodiment, the radiant electromagnetic energy is redirected within the collimating waveguide by total internal reflection (TIR). Examples of TIR lens elements are disclosed in U.S. Pat. Nos. 5,404,869 and 5,655,832, which are incorporated herein by reference.

In one embodiment, a collimating optical backlight receives radiant electromagnetic energy from a single point source. The radiant electromagnetic energy is optically coupled into the collimating waveguide and is redirected into a narrow (±5°) collimated and uniform angular field of view. A collimating waveguide is located (e.g., nested) within a high efficiency (85%-99%) white diffuse reflective material. In one embodiment, a holographic diffuser or a thin film micro-lens array is placed over the output surface of the collimating waveguide to produce a predetermined field of view for the collimated light that is emitted from the output aperture of the LCD cell.

Embodiments of a single optical component collimating waveguide incorporating an optical double-pass design reduces the overall number of precision optical elements and thus reduces cost. Furthermore, the optical alignment of the collimating and coupling elements are defined in a master tool, thus minimizing fabrication error and maximizing production yields.

FIGS. 1-7 illustrate one embodiment of a collimating waveguide 100. In the illustrated embodiment, the collimating waveguide 100 comprises an input surface 102 to receive radiant electromagnetic energy (e.g., light) from a point source such as, for example, a light emitting diode (LED), and an output surface 104 to emit an output beam of substantially collimated radiant electromagnetic energy. A first collimating surface 106 receives a beam 120 of the radiant electromagnetic energy entering from the input surface 102 traveling in a first direction and to reflect the radiant electromagnetic energy into a substantially collimated beam 122 of radiant electromagnetic energy traveling in a second direction, which is the reverse of the first direction. In the illustrated embodiment, the first collimating surface 106 also is a reflecting surface. A second collimating surface 108 receives the substantially collimated beam 122 of radiant electromagnetic energy and redirects or out-couples it toward the output surface 104. In one embodiment, the redirected beam 124 of radiant electromagnetic energy is emitted from the output surface 104 at an angle that is substantially normal to the output surface 104. In the illustrated embodiment, the second collimating surface 108 also is a reflecting surface. The redirected beam 124 of radiant electromagnetic energy is out-coupled into a narrow collimated and uniform angular field of view. It will be appreciated that the exit angle of the redirected beam 124 is not limited to a normal angle and may be predetermined to be any suitable exit angle that is less a critical angle with respect to the normal to the output surface 104 which would cause TIR to occur. Accordingly, the redirected beam 124 would be substantially collimated and would exit the output surface 104 at an angle that is greater than a critical TIR angle with respect to the normal to the output surface 104.

Figure 2:
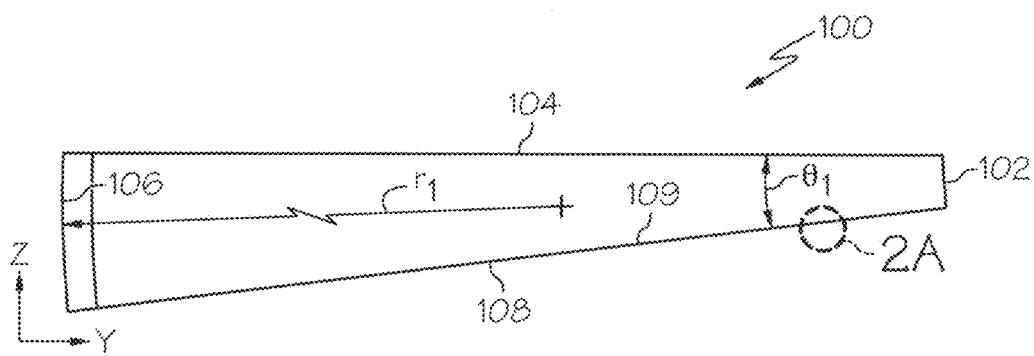
FIG. 2 is a side view of the embodiment of the collimating waveguide shown in FIG. 1.

As shown in FIG. 2, the collimating waveguide 100 has a wedge shaped body defining an angle $\theta_1$. In one embodiment, the wedge angle $\theta_1$ is about 7°. The embodiments, however, are not limited to these particular dimensions. Rather, suitable implementations of the disclosed embodiments may be realized with a wedge angle $\theta_1$ in the range of about 6° to about 8° and in one embodiment $\theta_1$ may be in the range of about 5° to about 9°.

In one embodiment, the input surface 102 of the collimating waveguide 100 comprises a microstructure. The microstructure comprises micro-prismatic features defined by a particular apex angle and radii to couple radiant electromagnetic energy from a point source such as, for example, a LED. In one embodiment, the micro-prismatic features comprise a plurality of linear prisms 105 each one defining an apex angle, a top tip radius, and a bottom tip radius. In the illustrated embodiment the top tip radius is greater then the bottom tip radius. In other embodiments, the top tip radius may be greater then the bottom tip radius. The input surface 102 of the collimating waveguide 100 shown in FIGS. 1-7 is substantially similar to the input surface 202 of the collimating waveguide 200 shown in FIGS. 8-14.

Figure 7:
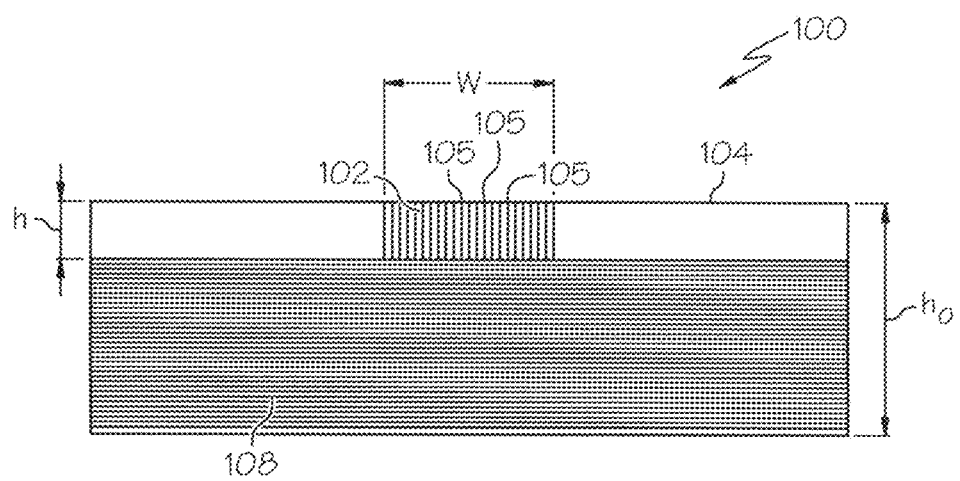
FIG. 7 is a front view of the embodiment of the collimating waveguide shown in FIG. 1.
Figure 8:
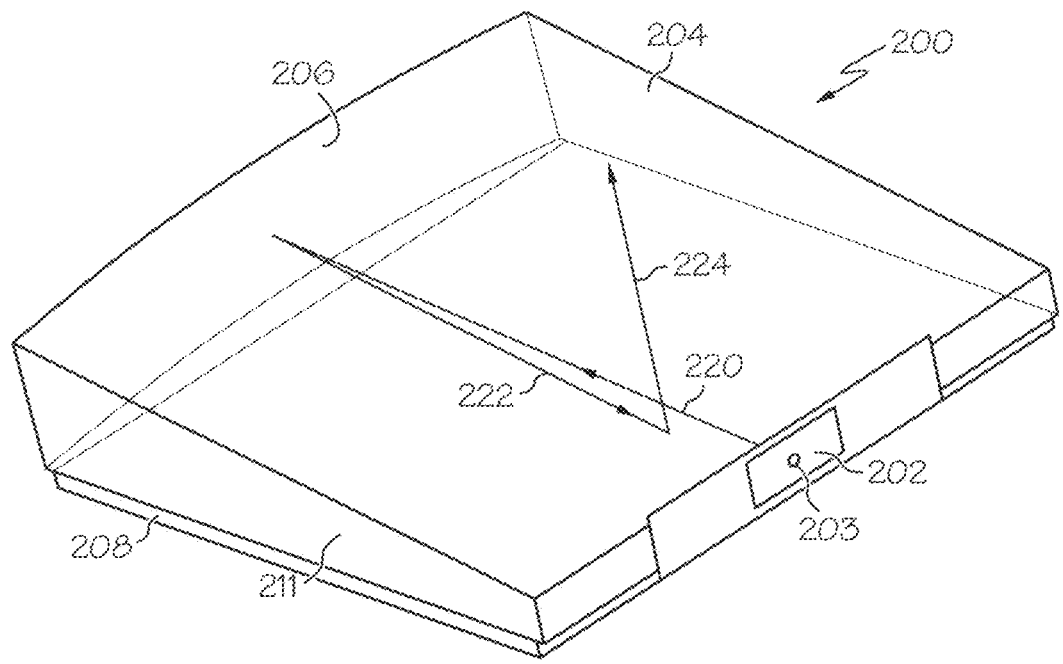
FIG. 8 is a perspective view of one embodiment of a collimating waveguide optically coupled to a point source.
Figure 9:
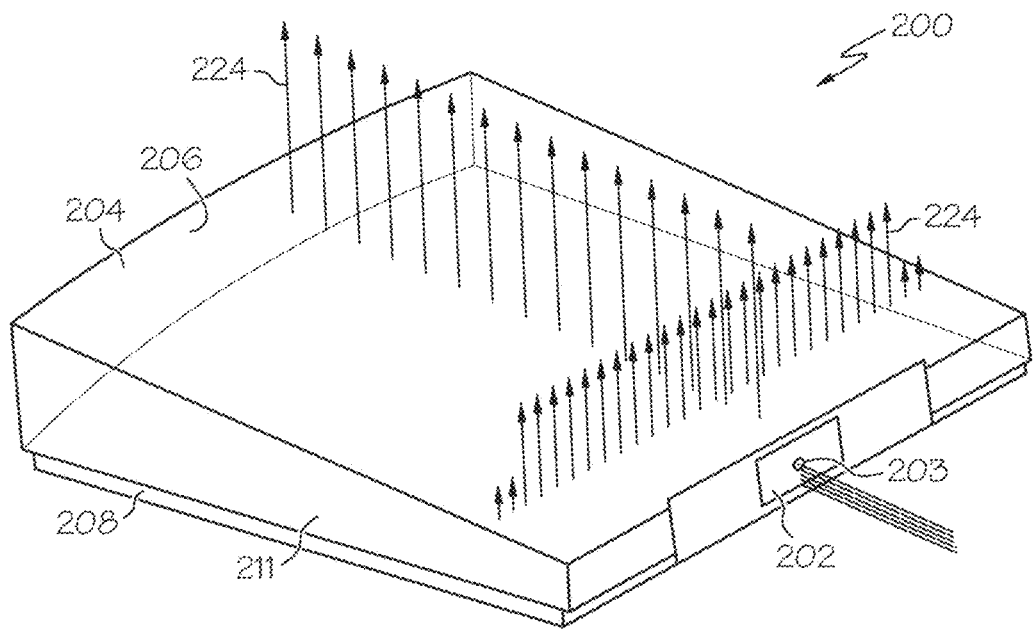
FIG. 9 is another perspective view of the embodiment of a collimating waveguide shown in FIG. 8.
Figure 10:
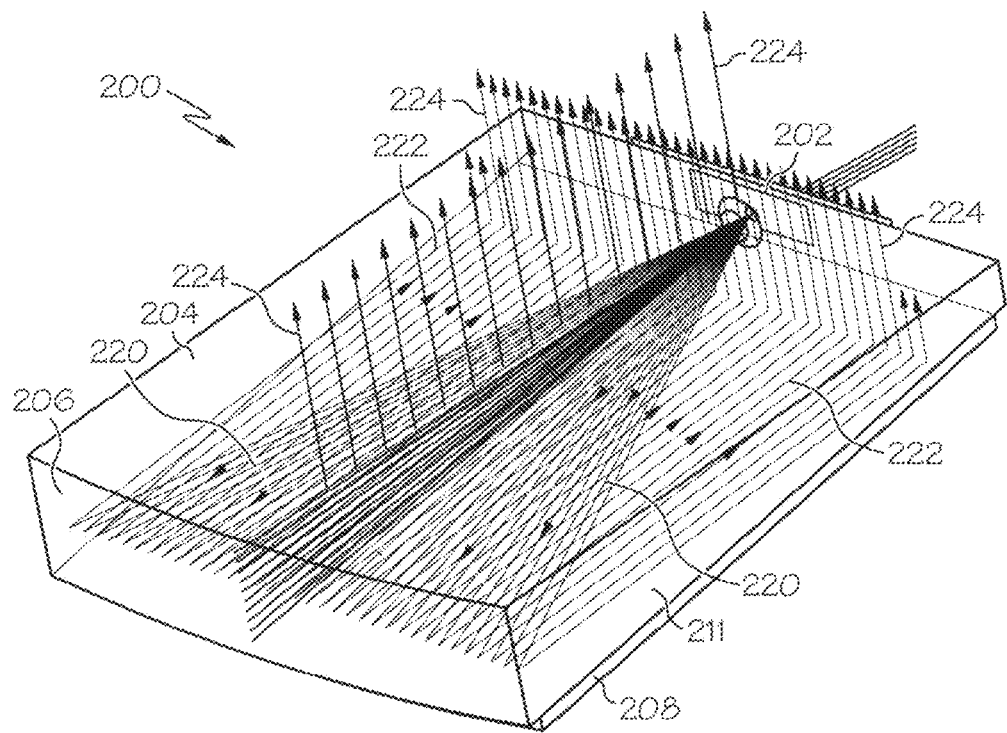
FIG. 10 is another perspective view of the embodiment of a collimating waveguide shown in FIG. 8.
Figure 13:
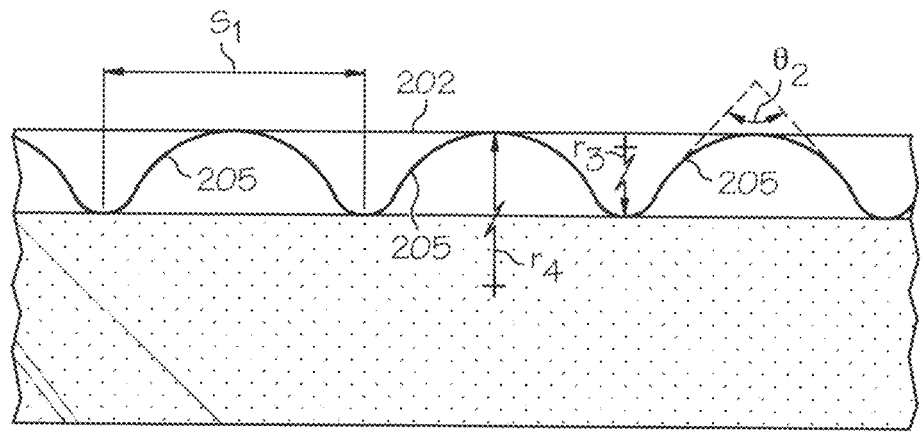
FIG. 13 is a detail view of an input surface of the embodiments of the collimating waveguides shown in FIGS. 1 and 8.

With reference now to FIGS. 7 and 13, in one embodiment, the input surface 102 comprises a plurality of linear prisms 205 spaced apart by a distance $s_1$. Each of the linear prisms 105 (205) may be defined by an apex angle $\theta_2$, a first top tip radius $r_4$, and a second bottom tip radius $r_3$. In the embodiment illustrated in FIGS. 7 and 13, the linear prisms 105 (205) spacing is about 0.1 mm (about 100 µm), the apex angle $\theta_2$ is about 80°, the top tip radius $r_4$ is about 50 µm, and the bottom tip radius $r_3$ is about 10 µm. The embodiments, however, are not limited to these particular dimensions. Rather, suitable implementations of the disclosed embodiments may be realized with a spacing distance in the range of about 0.09 mm to about 0.11 mm (about 90 µm to about 110 µm), an apex angle $\theta_2$ in the range of about 70° to about 90°, the top tip radius $r_4$ in the range of about 40 µm to about 60 µm, and the bottom tip radius $r_3$ in the range of about 1 µm to 20 µm.

With reference now to FIG. 7, in one embodiment, the optically active input area of the input surface 102 may be selected from the range of about 1.4 mm (h) by about 3 mm (w), where h is the height and w is the width. The embodiments, however, are not limited to these particular dimensions. Rather, suitable implementations of the disclosed embodiments may be realized where the input surface 102 has a height h in the range of about 1 mm to about 2 mm and a width w in the range of about 2 mm to about 4 mm.

Turning back to FIGS. 1-7, in one embodiment, the output surface 104 of the collimating waveguide 100 is substantially optically flat to minimize surface roughness. In the embodiment illustrated in FIGS. 1-7, the output surface 104 is a smooth uncoated optical TIR surface. Accordingly, the input beam 120 of radiant electromagnetic energy can be redirected within the collimating waveguide 100 by TIR of the output surface 104. In one embodiment, the output surface 104 has an aspect ratio of about 4:3. In the embodiment illustrated in FIG. 3, the output surface 104 has an optically active area having a length $l_o$ of about 20 mm, a width $w_o$ of about 15 mm, and an aperture of about 2.54 cm (~1.0") measured along the diagonal. The embodiments, however, are not limited to these particular dimensions. Rather, suitable implementations of the disclosed embodiments may be realized where the optically active area has a length $l_o$ in the range of about 1 mm to about 100 mm and a width $w_o$ in the range of about 0.75 mm to about 75 mm. Other suitable aspect ratios include aspect ratios of X:Y such as 16:9 as is currently popular in large screen notebook computers and large screen LCD TVs without necessarily restricting the scope of the disclosed embodiments. It will be appreciated that the dimensions discussed above in reference to the input surface 102 may be scaled in accordance with a desired aspect ratio and a desired optically active area of the output surface 104.

Figure 3:
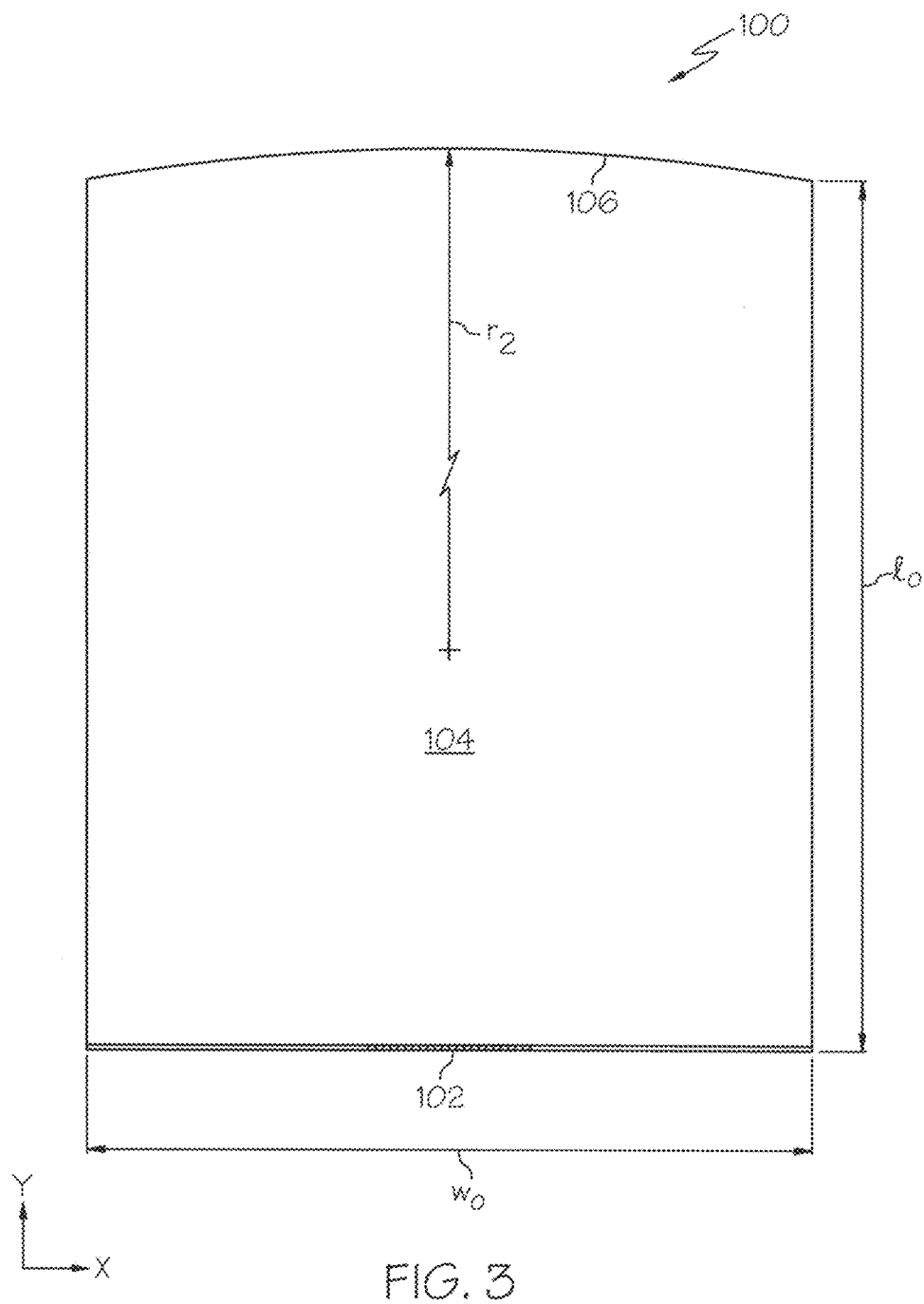
FIG. 3 is a top view of the embodiment of the collimating waveguide shown in FIG. 1.
Figure 4:
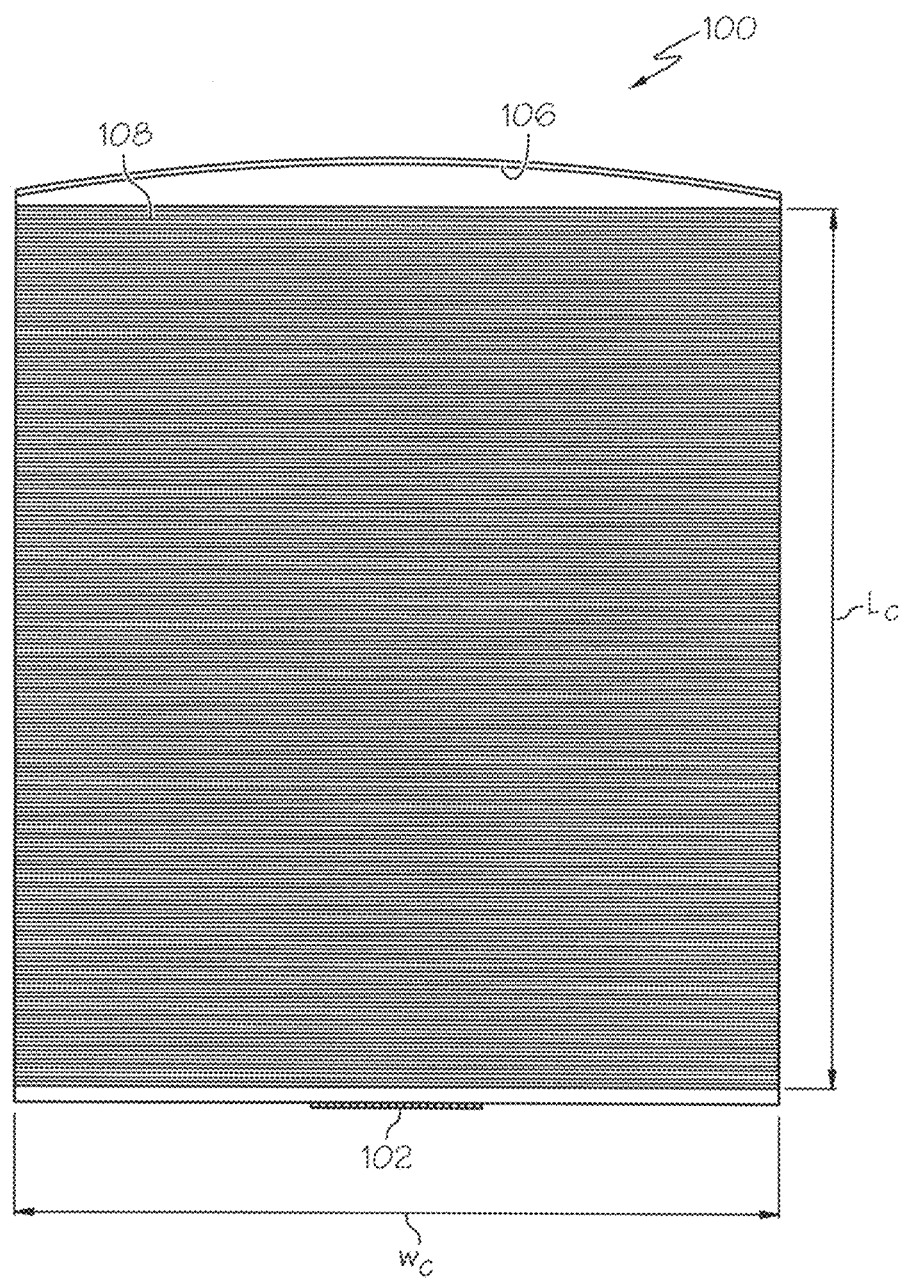
FIG. 4 is a bottom view of the embodiment of the collimating waveguide shown in FIG. 1.
Figure 5:
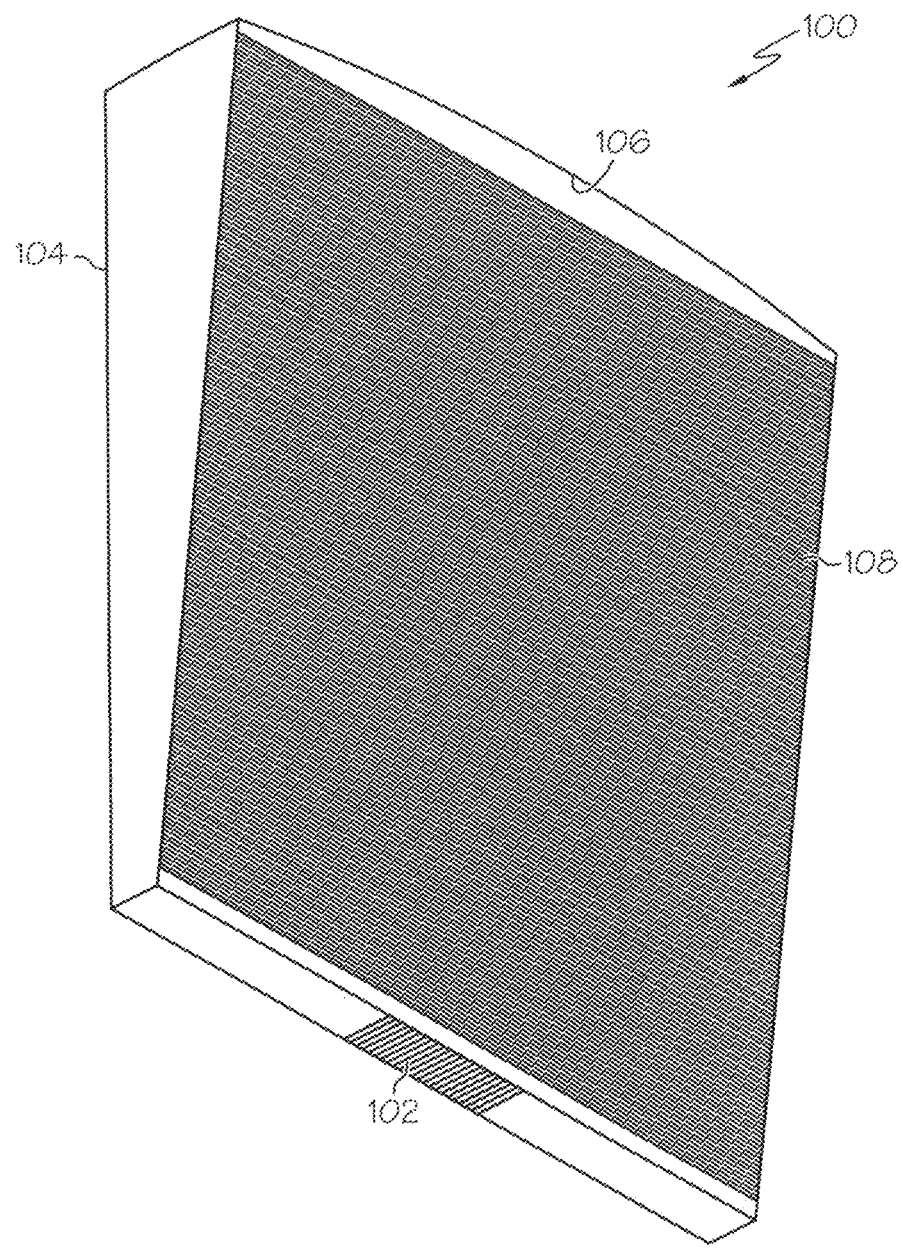
FIG. 5 is another perspective view of the embodiment of the collimating waveguide shown in FIG. 1.
Figure 6:
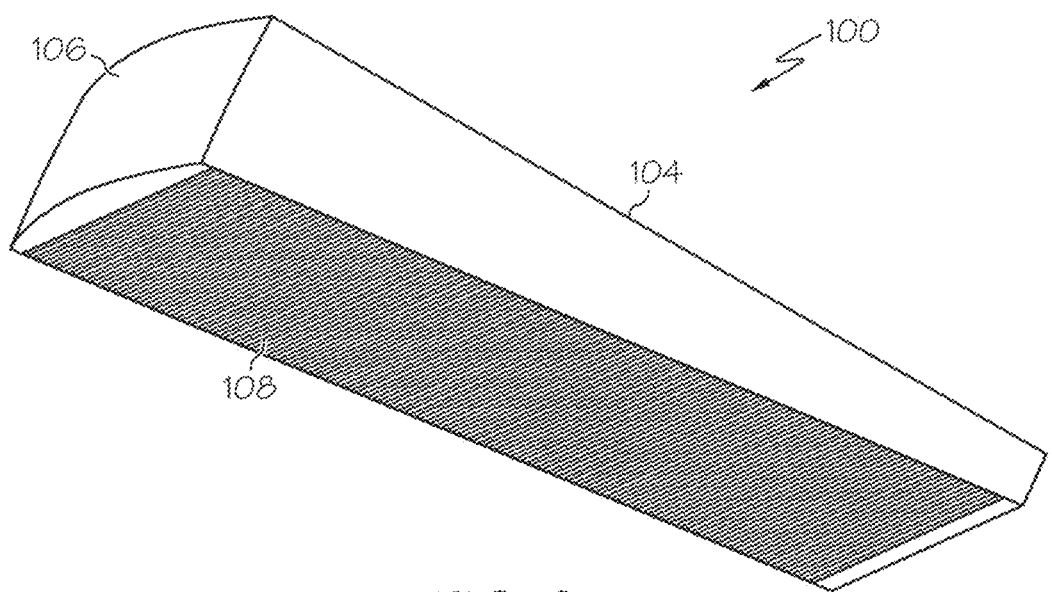
FIG. 6 is another perspective view of the embodiment of the collimating waveguide shown in FIG. 1.

With reference still to FIGS. 1-7, in one embodiment, the first reflecting/collimating surface 106 of the collimating waveguide 100 comprises a curved surface. The curved surface may be defined by a first radius $r_1$, as shown in FIG. 2, and a second radius $r_2$ as shown in FIG. 3. In the illustrated embodiment, the curved surface is a spherical surface and thus $r_1=r_2$ and the radius of curvature may be defined by a single radius $r_1=r_2$. In one embodiment, the spherical surface may have a radius of curvature $r_1=r_2$ of about 55 mm. The surface of the first reflecting/collimating surface 106 may be smooth and may have a width $w_o$ of about 18 mm and a height $h_o$ of about 4.1 mm. The embodiments, however, are not limited to these particular dimensions. Rather, suitable implementations of the disclosed embodiments may be realized where the radius of curvature is in the range of about 45 mm to about 65 mm, the width $w_o$ is in the range of about 16 mm to about 20 mm, and the height $h_o$ is in the range of about 1 mm to about 6 mm.

In one embodiment, the surface of the first reflective/collimating surface 106 may be reflective. The reflective surface may be made of a metallic material such as protective aluminum or other reflective metallic or non-metallic materials that have a specified reflectivity.

Figure 2A:
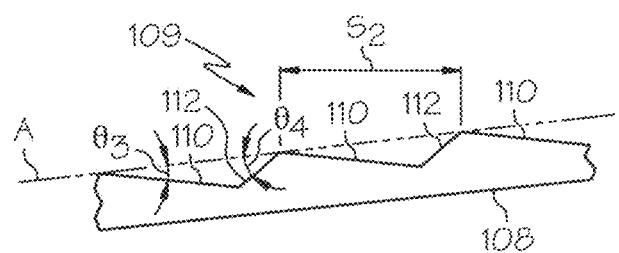
FIG. 2A is a detail view of a collimating surface of the embodiment of the collimating waveguide shown in FIG. 2.

FIG. 2A is a detail view of a collimating surface of the embodiment of the collimating waveguide shown in FIG. 2. In one embodiment, the second reflecting/collimating surface 108 of the collimating waveguide 100 comprises a microstructure formed on an internal portion of the second reflecting/collimating surface 108. That is, the microstructure is located within a body portion of the collimating waveguide 100 to redirect the substantially collimated beam 122 of radiant electromagnetic energy. The microstructure redirects the collimated beam 122 towards the output surface 104. The redirected beam 124 is out-coupled to the output surface 104 as a substantially collimated uniform beam. In one embodiment, the microstructure comprises prismatic features such as, for example, a plurality of linear prisms 109 each one defining a plurality of prismatic (e.g., step-like) features having a predetermined spacing. The plurality of linear prisms 109 ejects the incident collimated beam 122 of radiant electromagnetic energy towards the output surface 104. The spacing distance $s_2$ of the prismatic features (e.g., the linear prism 109) can be selected to optimize the uniformity of the ejected radiant electromagnetic energy beam 124 that is redirected to the output surface 104. As shown in FIG. 2A, each prismatic feature of the linear prisms 109 comprises a first facet 110 and a second facet 112. The second facet 112 is an ejection facet forming an angle relative to an axis A. In one embodiment, the first facet 110 forms a first angle $\theta_3$ relative to an axis A substantially parallel to the output surface 104 and the second facet 112 (e.g., ejection facet) forms a second angle $\theta_4$ (e.g., ejection facet angle) relative to the axis A. In the illustrated embodiment, the first angle $\theta_3$ is less than the second angle $\theta_4$. The spacing of the prismatic features is defined by a distance $s_2$. In the illustrated embodiment, the spacing $s_2$ is about 0.1 mm, the first angle $\theta_3$ is about 10°, and the second angle $\theta_4$ is about 37.5°. The embodiments, however, are not limited to these particular dimensions. Rather, suitable implementations of the disclosed embodiments may be realized where the spacing $s_2$ is in the range of about 0.09 mm to about 0.11 mm (about 90 µm to about 110 µm), the first angle $\theta_3$ is in the range of about 9° to 11°, and the second angle $\theta_4$ is in the range of about 33.75° to about 41.25°.

In one embodiment, the second reflecting/collimating surface 108 of the collimating waveguide 100 comprises a reflective surface. The reflective surface may be made of a metallic material such as protective aluminum or other reflective metallic or non-metallic materials that have a specified reflectivity.

In the embodiment illustrated in FIGS. 1-7, the collimating waveguide 100 can be fabricated as a single optical component using injection molding or similar fabrication technologies. For example, the collimating waveguide 100 can be fabricated using compression molding, combination injection and compression molding, casting, ultraviolet (UV) casting cure roll-to-roll process, and/or machining using a diamond mill cutting process, for example. In other words, the body of the collimating waveguide 100 including the input surface 102, the first reflecting/collimating surface 106, and the second reflecting/collimating surface 108 may be formed integrally as a single optical component. The input surface 102 and the second reflecting/collimating surface 108 comprising the microstructures (e.g., the linear prisms) can be molded and both can be made translationally symmetric to facilitate common mastering techniques, like fly-cut diamond turning. In addition, the micro-prismatic features of the input surface 102 and the second reflecting/collimating surface 108 can be fabricated with relatively shallow profiles to minimize shrinkage effects during the component cooling phase. In one embodiment, the first (e.g., curved) collimating surface 106 may be fabricated as a sphere with a 55 mm radius of curvature and is substantially insensitive to surface warping or slight changes from the nominal radius of curvature. The embodiments, however, are not limited in this context.

In other embodiments, a body portion of a collimating waveguide can be fabricated separately from the microstructure features. For example, the body portion of the collimating waveguide can be fabricated as a single component using injection molding, compression molding, combination of injection and compression molding, casting, UV casting cure roll-to-roll process, and/or machining. Then, the components comprising the microstructure features can be fabricated in a separate process. For example, the components comprising the micro-prismatic features such as the input surface and the second collimating surface can be fabricated separately as a film comprising the prismatic microstructures using conventional film making technologies. The films comprising the prismatic microstructures can then be applied or laminated onto the body of the collimating waveguide.

FIGS. 8-14 illustrate one embodiment of a collimating waveguide 200. In the illustrated embodiment, the collimating waveguide 200 comprises an input surface 202 to receive radiant electromagnetic energy (e.g., light) from a point source 203 (e.g., an LED), and an output surface 204 to emit an output beam of substantially collimated radiant electromagnetic energy. A first collimating surface 206 receives a beam 220 of the radiant electromagnetic energy entering from the input surface 202 traveling in a first direction and to reflect the radiant electromagnetic energy into a substantially collimated beam 222 of radiant electromagnetic energy traveling in a second direction, which is the reverse of the first direction. A second collimating surface 208 receives the substantially collimated beam 222 of radiant electromagnetic energy and redirects or out-couples it toward the output surface 204. In one embodiment, the redirected beam 224 of radiant electromagnetic energy is emitted from the output surface 204 at an angle that is substantially normal to the output surface 204. The redirected beam 224 of radiant electromagnetic energy is out-coupled into a narrow collimated and uniform angular field of view. In various other embodiments, the redirected beam 224 can be redirected as a substantially collimated beam exiting the output surface 204 at an angle that is greater than a critical TIR angle with respect to the normal to the output surface 204.

In operation, the collimating waveguide 200 illustrated in FIGS. 8-14 is substantially similar to the operation of the collimating waveguide 100 shown in FIGS. 1-7. The collimating waveguide 200, however, may be fabricated by first fabricating a smooth body 211 and then applying (e.g., laminating) a first film comprising the input surface 202 micro-prismatic structures and a second film comprising the second collimating surface 208 micro-prismatic microstructures onto the smooth body 211. Ultimately, the collimating waveguide 200 behaves as a single optical component in a manner similar to that previously discussed with respect to the collimating waveguide 100 shown in FIGS. 1-7.

Figure 11:
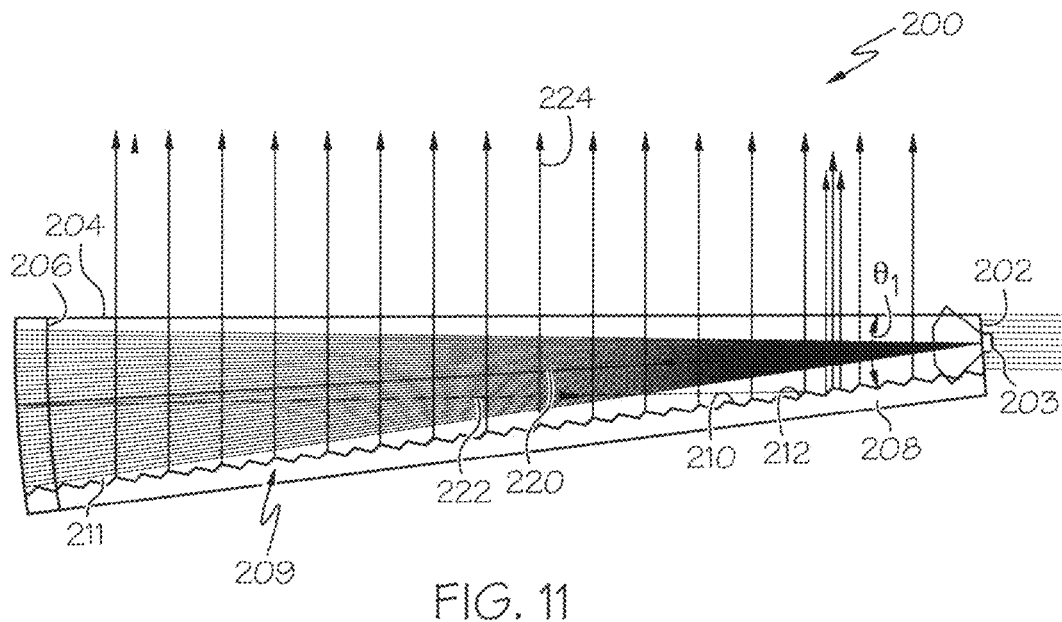
FIG. 11 is a side view of the embodiment of a collimating waveguide shown in FIG. 8.
Figure 12:
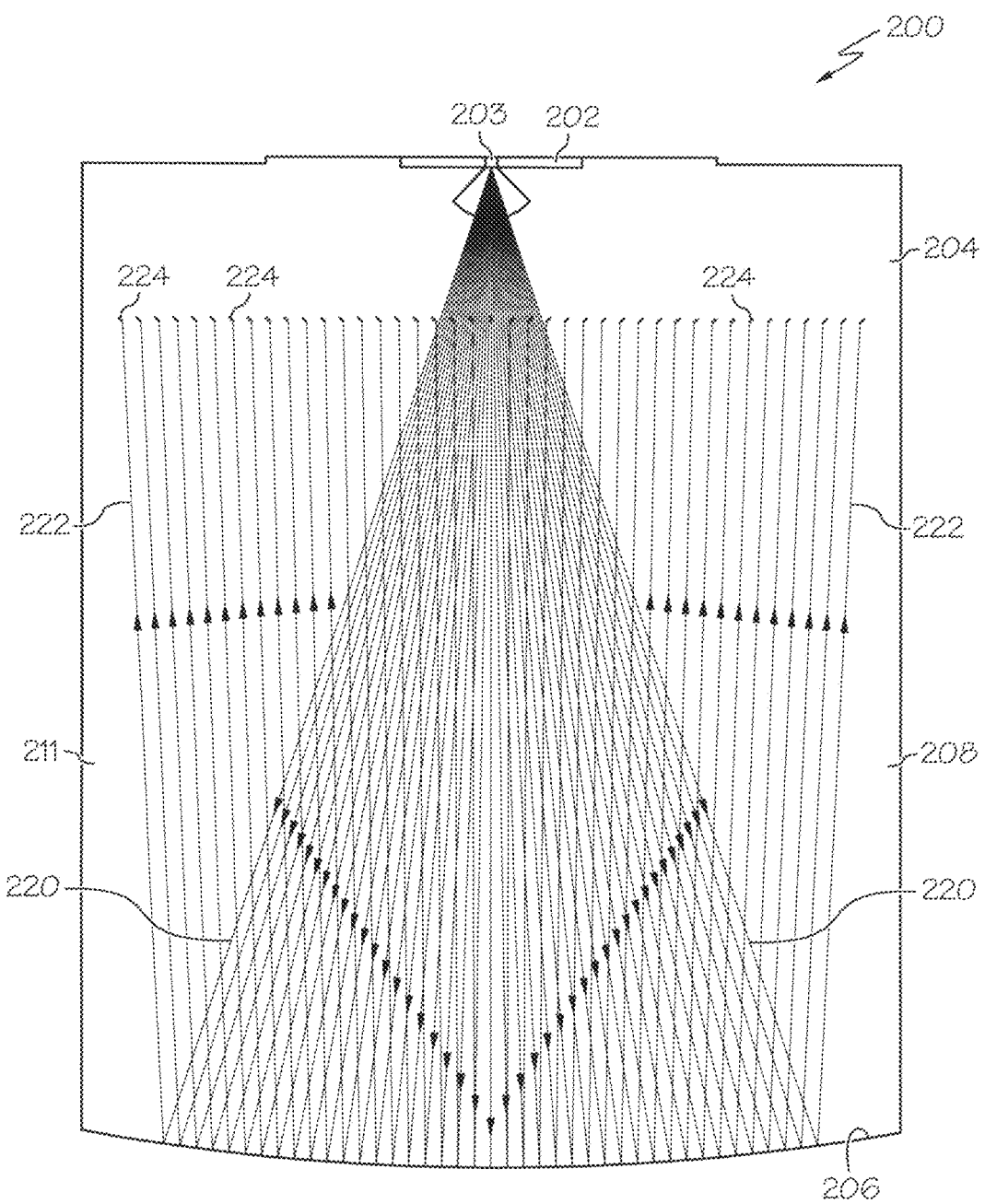
FIG. 12 is a top view of the embodiment of a collimating waveguide shown in FIG. 8.
Figure 14:
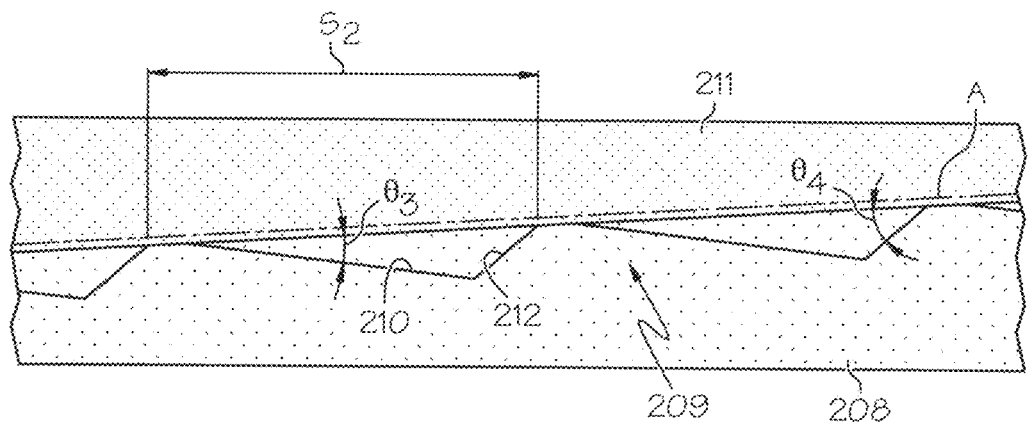
FIG. 14 is a detail view of a collimating surface of the embodiments of the collimating waveguides shown in FIGS. 1 and 8.

As shown in FIGS. 11, 14, the second collimating surface 208 film is applied (e.g., laminated) onto the smooth body 211 portion of the collimating waveguide 200. The micro-prismatic features of the second collimating surface 208 are substantially similar to the micro-prismatic features of the second reflecting/collimating surface 108 of the collimating waveguide 100 described with reference to FIGS. 1-7. In one embodiment, the second collimating surface 208 of the collimating waveguide 200 comprises a microstructure formed on a film, which is applied to the body 211. The prismatic microstructure redirects the collimated beam 222 and the redirected beam 224 is out-coupled to the output surface 204 as a substantially collimated uniform beam. In one embodiment, the prismatic microstructure comprises prismatic features such as, for example, a plurality of linear prisms 209 each one defining a plurality of prismatic (e.g., step-like) features having a predetermined spacing for ejecting the incident collimated beam 222 of radiant electromagnetic energy. The spacing dimension of the prismatic features (e.g., the linear prism 209) can be selected to optimize the uniformity of the ejected radiant electromagnetic energy beam 224 that is redirected to the output surface 204. As shown in FIG. 14, each prismatic feature of the linear prisms 209 comprises a first facet 210 and a second facet 212. The second facet 212 is an ejection facet forming an angle relative to an axis A. In one embodiment, the first facet 210 forms a first angle $\theta_3$ relative to an axis A substantially parallel to the output surface 204 and the second facet 212 (e.g., ejection facet) forms a second angle $\theta_4$ (e.g., ejection facet angle) relative to the axis A. In the illustrated embodiment, the first angle $\theta_3$ is less than the second angle $\theta_4$. The spacing of the prismatic features is defined by a distance $s_2$. In the illustrated embodiment, the spacing $s_2$ is about 0.1 mm, the first angle $\theta_3$ is about 10°, and the second angle $\theta_4$ is about 37.5°. The embodiments, however, are not limited to these particular dimensions. Rather, suitable implementations of the disclosed embodiments may be realized where the spacing $s_2$ is in the range of about 0.09 mm to about 0.11 mm (about 90 µm to about 110 µm), the first angle $\theta_3$ is in the range of about 9° to 11°, and the second angle $\theta_4$ is in the range of about 33.75° to about 41.25°.

In one embodiment, the first and second collimating surfaces 206, 208 of the collimating waveguide 200 comprises a reflective surface. The reflective surface may be made of a metallic material such as protective aluminum or other reflective metallic or non-metallic materials that have a specified reflectivity.

Embodiments of the collimating waveguides 100, 200 may be fabricated from a variety of optical materials. In one embodiment, the collimating waveguides 100, 200 may be fabricated form an optical polymer that is transparent and low scattering. Examples of such optical polymers include, without limitation, acrylic, polycarbonate, and silicone. In one embodiment, the collimating waveguides 100, 200 may be fabricated from optical grade acrylic where n=1.49, for example.

In various embodiments, the collimating waveguides 100, 200 provide a respective collimated output beam 124, 224 having a predetermined brightness, uniformity, and angular spectrum. In one embodiment, the output beam 124, 224 may have a brightness of about 3,500 fl (about 12,000 nits) at an LED drive current of 20 mA (10 mA per LED) with an output of 2 lumens. In another embodiment, the output beam 124, 224 may have a brightness of about 6,000 fl (about 41,000 nits) at an LED drive current of 40 mA (20 mA per LED) with an output of 4 lumens. The output beam 114, 224 may have a uniformity of less then 10% and an angular spectrum of ±10° FWHM (full width half maximum).

In various embodiments, the point source 203 may comprise any suitable source of radiant electromagnetic energy including, for example, an incandescent light bulb, one or more LEDs, an electroluminescent panel (ELP), one or more cold cathode fluorescent lamp (CCFL), or hot cathode fluorescent lamps (HCFL). The point source 203 may generate color light although white light LED backlighting is also contemplated in the various embodiments. In one embodiment, the point source 203 may comprise one or more red-green-blue (RGB) LED point sources.

In various embodiments, the point source 203 may be a source of light with wavelengths in the visible and/or invisible spectrum including light having wavelengths ranging from ultraviolet to infrared wavelengths. In various other embodiments, the radiant electromagnetic energy point source 203 may be a source of X-rays, microwaves, and radio waves. In one embodiment, the point source 203 may be configured to radiate light at a single monochromatic wavelength. It will be appreciated by those skilled in the art that the point source 203 may comprise one or more light emitting elements that, when energized by an electrical power source, may be configured to radiate electromagnetic energy in the visible spectrum as well as the invisible spectrum. The visible spectrum, sometimes referred to as the optical spectrum or luminous spectrum, is that portion of the electromagnetic spectrum that is visible to (e.g., can be detected by) the human eye and may referred to as visible light or simply light. A typical human eye will respond to wavelengths in air from about 380 nm to about 750 nm. The visible spectrum is continuous and without clear boundaries between one color and the next. The following ranges may be used as an approximation of color wavelength:

Violet: about 380 nm to about 450 nm;
Blue: about 450 nm to about 495 nm;
Green: about 495 nm to about 570 nm;
Yellow: about 570 nm to about 590 nm;
Orange: about 590 nm to about 620 nm; and
Red: about 620 nm to about 750 nm.

The invisible spectrum (i.e., non-luminous spectrum) is that portion of the electromagnetic spectrum lies below and above the visible spectrum (e.g., below about 380 nm and above about 750 nm). The invisible spectrum is not detectable by the human eye. Wavelengths greater than about 750 nm are longer than the red visible spectrum and they become invisible infrared, microwave, and radio electromagnetic radiation. Wavelengths less than about 380 nm are shorter than the violet spectrum and they become invisible ultra-violet, x-ray, and gamma ray electromagnetic radiation.

In one embodiment, multiple light sources 203 configured to radiate light in the visible spectrum may be disposed in a predetermined array or arrangement. When the light sources 203 are energized by an electrical power system, the light sources 203 produce a specific uniform predetermined spectral output suitable for use backlight apparatuses.

Figure 15:
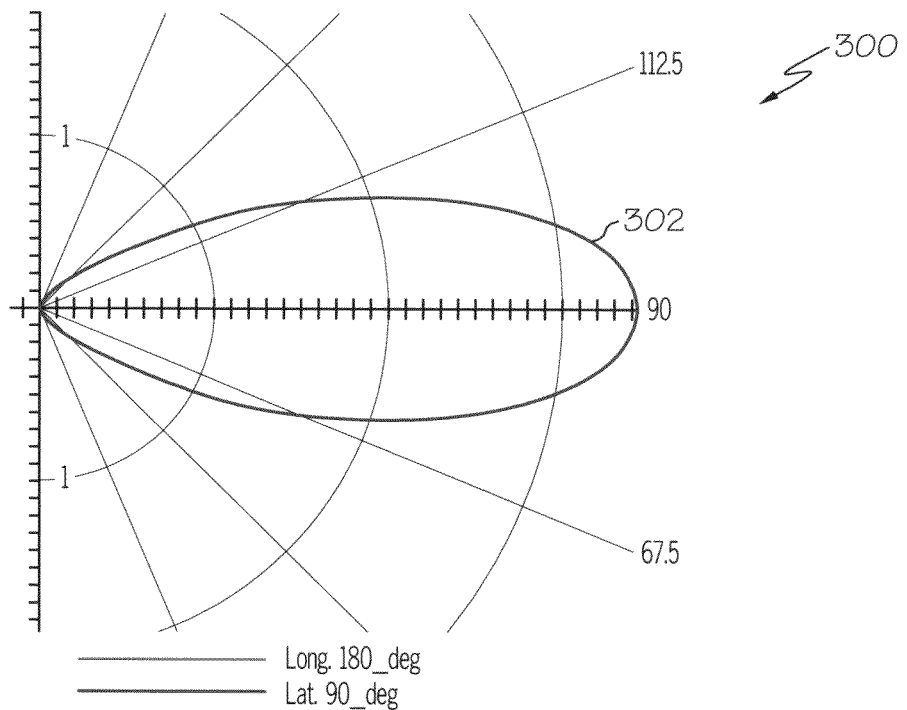
FIG. 15 illustrates an angular output plot of a light emitting diode (LED) source model of a point source.
Figure 16:
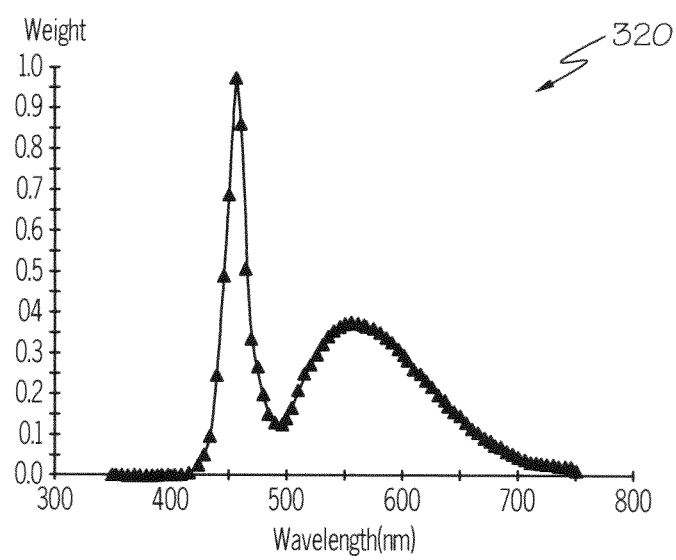
FIG. 16 illustrates a spectral distribution plot of the light emitting diode (LED) source model of FIG. 15.

FIGS. 15-16 illustrate the respective angular output and spectral distribution of a typical LED light source that may be optically coupled to the collimating waveguides 100, 200. FIG. 15 illustrates an angular output plot 300 of a light emitting diode (LED) source model of a point source. The angular output plot 300 assumes an LED point source 203 described according to an LED model Toyoda Gosei E1566-YW1K7-09 for a side emitting rectangular LED having an output size of 1.2 mm by 2.8 mm. The LED angular output is a 36° FWHM Gaussian distribution. The angular output plot 300 graphically depicts the spread of a light beam 302 that is output by the LED point source relative to a normal plane of the LED. As shown, the light beam 302 spreads ±22.5° from normal (i.e., 90°).

FIG. 16 illustrates a spectral distribution plot 320 of the light emitting diode (LED) source model of FIG. 15. The spectral distribution plot 320 graphically depicts the wavelength of the LED point source along the x-axis versus the weight along the y-axis. As shown, the LED is a white (phosphor) with a maximum output at a wavelength of about 450 nm and a lower output of about 550 nm.

FIGS. 17-20 graphically illustrate illuminance (optical power), luminance (brightness), luminous intensity, and angular output, respectively, of the collimated output beam 124, 224 emitted from the respective output surface 102, 204 of the respective collimating waveguide 100, 200. The input power into the collimating waveguide 100, 200 from an LED point source 203 is 2.0 lumens (3.2V, 7 mA, and 30% LED efficiency. The output power of the collimated output beam 124, 224 is 0.44 lumens. The optical efficiency, which is the ratio of the output power (0.44 lumens) to the input power (2.0 lumens), is (0.44/2.0)*100=22%.

Figure 17:
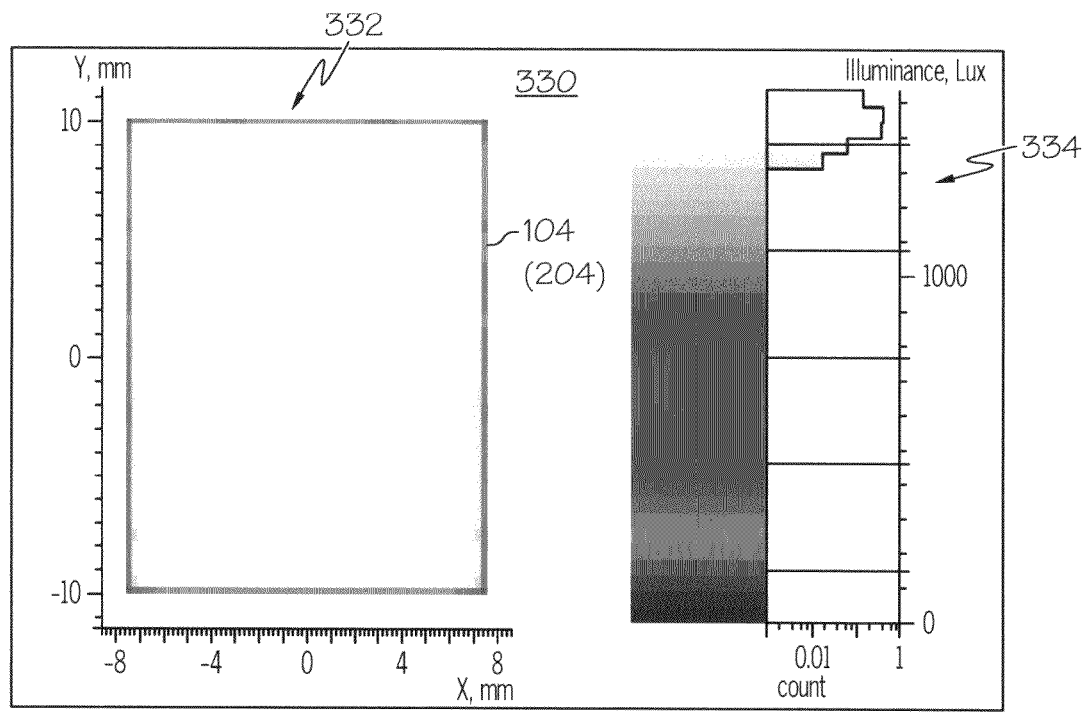
FIG. 17 is a plot graphically depicting the illuminance or optical power of the light emitted from an output surface of one embodiment of a collimating waveguide.

FIG. 17 is a plot 330 graphically depicting the illuminance 332 or optical power of the light emitted from the output surface 104, 204 of the respective collimating waveguide 100, 200. The output surface 104, 204 has an optically active area having a length $l_o$ of about 20 mm, a width $w_o$ of about 15 mm, and an optical aperture of about 2.54 cm (~1.0") measured along the diagonal. The illuminance scale 334 in units of "lux" is shown to the right of the illuminance plot 332. As shown in FIG. 17, the average illuminance is about 1450 lux with a contrast ratio of about 7.2%.

Figure 18:
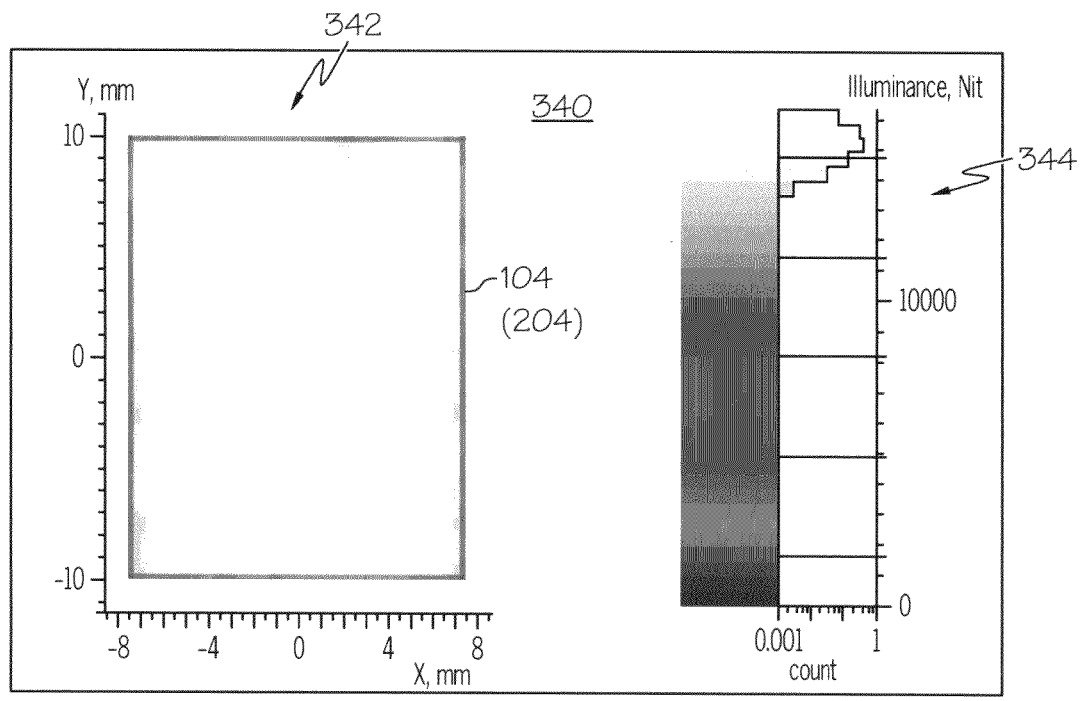
FIG. 18 is a plot graphically depicting the luminance or optical brightness of the light emitted from an output surface of one embodiment of a collimating waveguide.

FIG. 18 is a plot 340 graphically depicting the luminance 342 or optical brightness of the light emitted from the output surface 104, 204 of the respective collimating waveguide 100, 200. The output surface 104, 204 has an optically active area having a length $l_o$ of about 20 mm, a width $w_o$ of about 15 mm, and an optical aperture of about 2.54 cm (~1.0") measured along the diagonal. The luminance scale 344 in units of "nits" is shown to the right of the luminance plot 342. As shown in FIG. 18, the average luminance is about 15,200 nits with a contrast ratio of about 8.5%.

Figure 19:
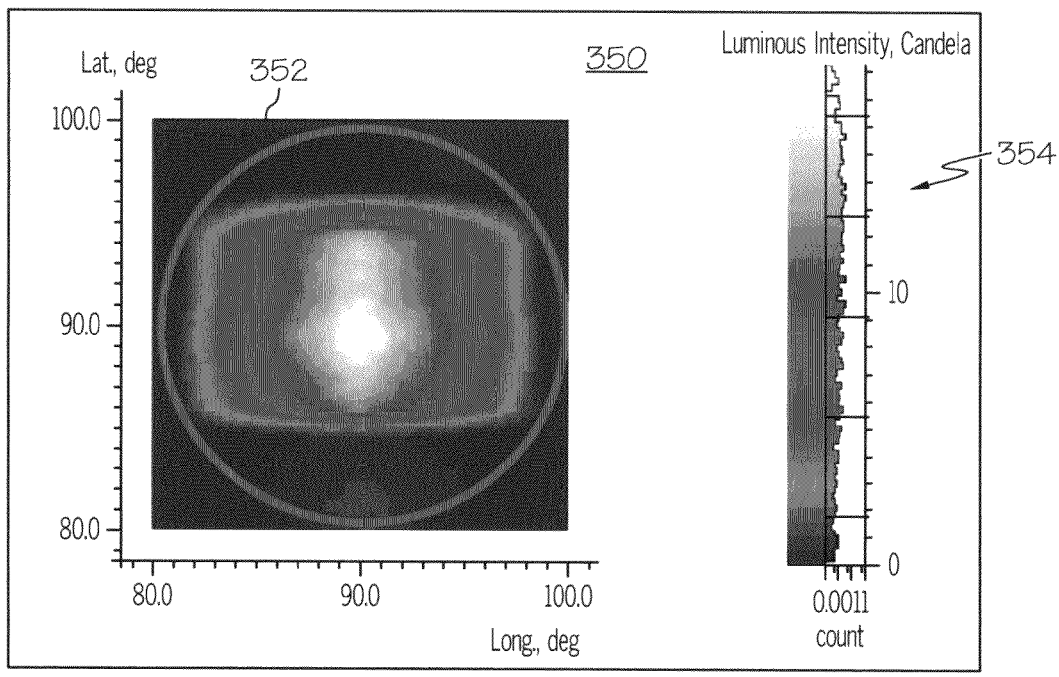
FIG. 19 is a plot graphically depicting the luminous intensity of the light emitted from an output surface of one embodiment of a collimating waveguide.

FIG. 19 is a plot 350 graphically depicting the luminous intensity 352 of the light emitted from the output surface 104, 204 of the respective collimating waveguide 100, 200. The output surface 104, 204 has an optically active area having a length $l_o$ of about 20 mm, a width $w_o$ of about 15 mm, and an optical aperture of about 2.54 cm (~1.0") measured along the diagonal. The luminous intensity scale 354 in units of "candela" is shown to the right of the luminous intensity plot 352. As shown in FIG. 19, the peak luminous intensity is about 15 candela with an angular extent of about ±4.2°.

Figure 20:
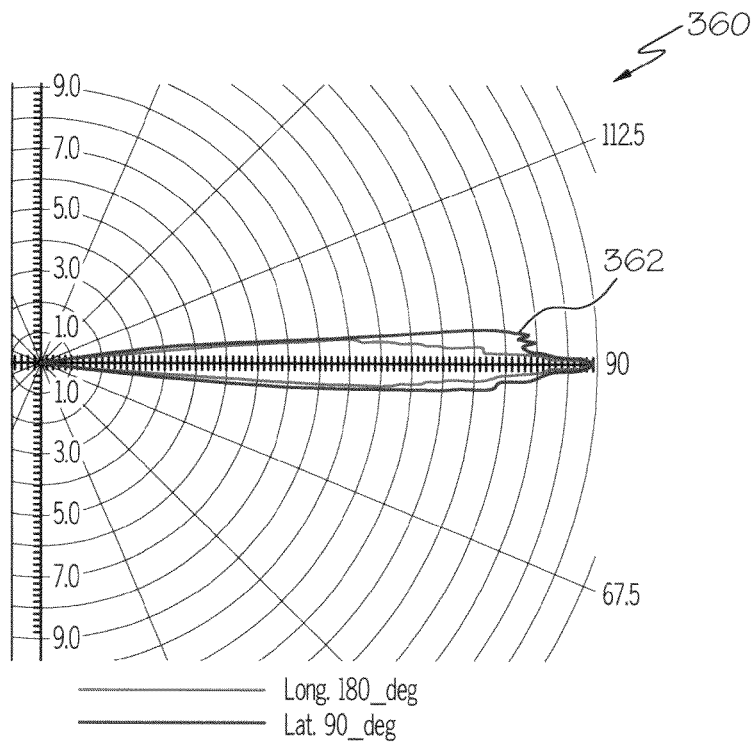
FIG. 20 is a plot of the angular output intensity of the light emitted from an output surface of one embodiment of a collimating waveguide.

FIG. 20 is a plot 360 of the angular output intensity of the light emitted from the output surface 104, 204 of the respective collimating waveguide 100, 200. As shown in FIG. 20, the peak luminous intensity is about 15 candela with an angular extent of about ±4.2°.

Figure 21:
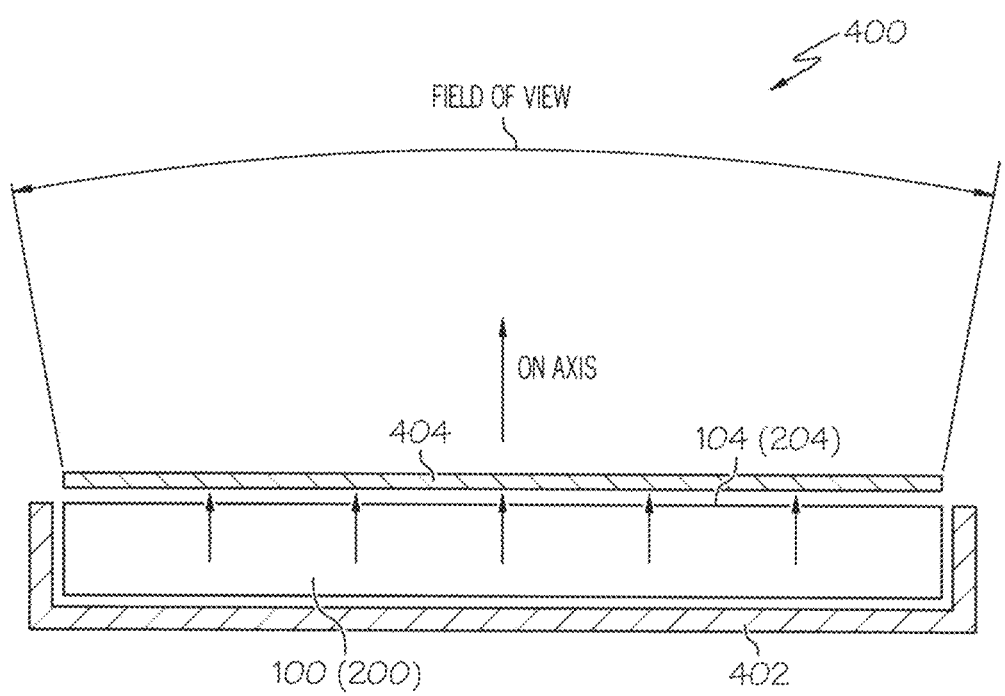
FIG. 21 illustrates one embodiment of a collimating optical backlight.

FIG. 21 illustrates one embodiment of a collimating optical backlight 400. In the embodiment illustrated in FIG. 21, the collimating optical backlight 400 comprises a reflective cavity 402 and a collimating waveguide 100, 200, as disclosed and described herein, located with the reflective cavity 402. In one embodiment, the reflective cavity 402 comprises a high efficiency white diffuse reflective material where the material may be 99% reflective.

With reference now to the embodiments of the collimating waveguides 100, 200 described with reference to FIGS. 1-14, the collimating waveguide 100, 200 comprises an input surface 102, 202 to receive radiant electromagnetic energy from a point source 203, an output surface 104, 204 to emit an output beam 124, 224 of substantially collimated radiant electromagnetic energy, a first reflecting/collimating surface 106, 206 to receive a beam 120, 220 of the radiant electromagnetic energy entering from the input surface 120, 202 traveling in a first direction and to reflect the radiant electromagnetic energy into a substantially collimated beam 122, 222 of radiant electromagnetic energy traveling in a second direction, which is the reverse of the first direction, and a second reflecting/collimating surface 108, 208 to receive the substantially collimated beam 122 of radiant electromagnetic energy and to redirect a substantially collimated beam 124, 224 toward the output surface 104, 204. The embodiments of the collimating waveguides 100, 200 and their operation are discussed above and for conciseness and clarity will not be repeated here.

With reference now to FIGS. 1-14 and 21, the collimating optical backlight 400 further comprises a source of radiant electromagnetic energy coupled to the input surface of the collimating waveguide 100, 200. In one embodiment, the source of radiant electromagnetic energy may be a LED.

In one embodiment, the collimating optical backlight 400 comprises a diffuser 404 located over the output surface 104, 204 of the collimating waveguide 100, 200. It will be appreciated that various types of diffusers 404 may be employed, and in one embodiment, the diffuser 404 comprises a holographic pattern formed thereon. The diffuser 404 redirects the radiant electromagnetic energy from the output surface 104, 204 of the collimating waveguide 100 to a narrow collimated and uniform angular field of view. In the embodiment illustrated in FIG. 21, the diffuser 404 is a 10° angular diffuser, which provides an angula field of view of about 10°. Examples of holographic diffusers are described in "An Overview of LED Applications for General Illumination" (Conference Proceedings Paper), David G. Pelka, Kavita Patel, SPIE Vol. 5186, November 2003; and "Keen Forms of Kinoforms—Kinoform-based Diffusers Help Lighting Designers Leverage Unique LED Advantages," David G. Pelka, OE Magazine, Vol. 3 No. 10, p. 19, October 2003, both of which are incorporated herein by reference.

Figure 22:
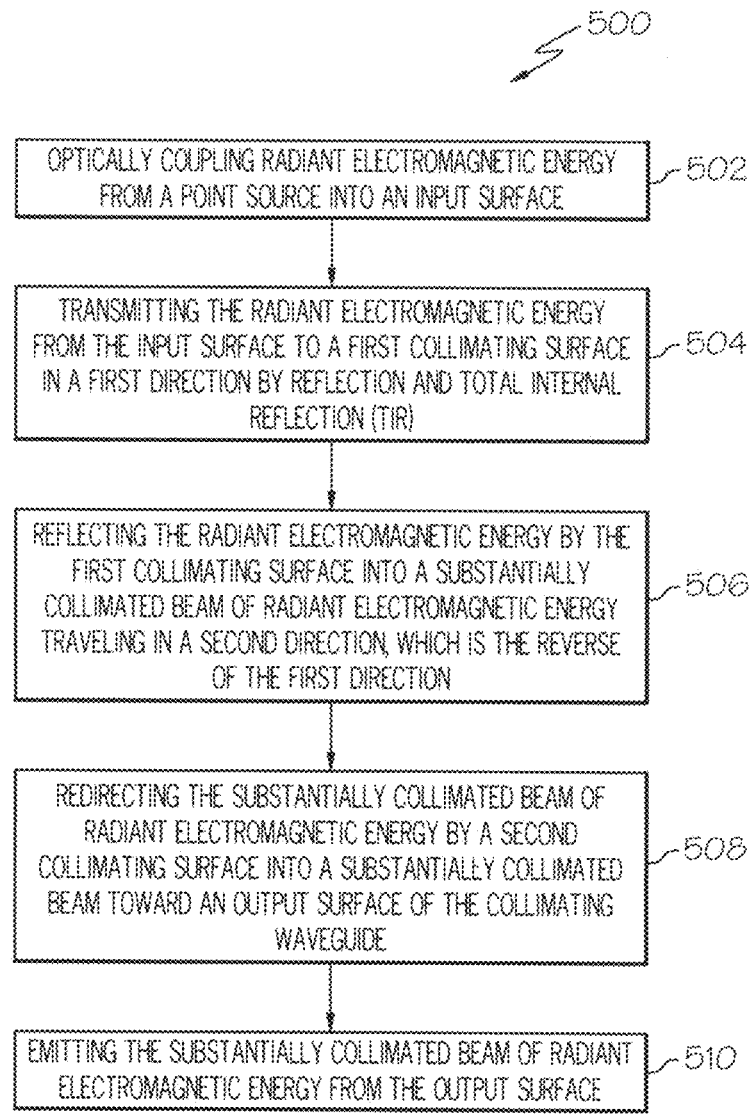
FIG. 22 is a diagram of a method of producing a collimated beam of radiant electromagnetic energy using a collimating waveguide and/or a collimating optical backlight.

FIG. 22 is a diagram 500 of a method of producing a collimated beam of radiant electromagnetic energy using the embodiments of the collimating waveguide 100, 200 and/or the collimating optical backlight described herein with reference to FIGS. 1-21. As shown in FIG. 22, in one embodiment, the method comprises optically coupling 502 radiant electromagnetic energy from a point source into an input surface, transmitting 504 the radiant electromagnetic energy from the input surface 102, 202 to a first reflecting/collimating surface 106, 206 in a first direction by reflection and total internal reflection (TIR), reflecting 506 the radiant electromagnetic energy by the first reflecting/collimating surface 106, 206 into a substantially collimated beam 122, 222 of radiant electromagnetic energy traveling in a second direction, which is the reverse of the first direction, redirecting 508 the substantially collimated beam 122, 222 of radiant electromagnetic energy by a second reflecting/collimating surface 108, 208 into a substantially collimated beam 124, 224 toward an output surface 104, 204 of the collimating waveguide 100, 200, and emitting 510 the substantially collimated beam 124, 224 of radiant electromagnetic energy from the output surface 104, 204.

In one embodiment, optically coupling 502 comprises optically coupling the radiant electromagnetic energy through a microstructure, wherein the microstructure comprises a plurality of linear prisms 202 (FIG. 13) each one defining an apex angle $\theta_2$, a top tip radius $r_4$, and a bottom tip radius $r_3$, wherein the top tip radius $r_4$ is greater then the bottom tip radius $r_3$.

In one embodiment, reflecting 504 comprises reflecting the optically coupled radiant electromagnetic energy by an internal surface of the output surface 104, 204 by TIR.

In one embodiment, redirecting 508 comprises reflecting the substantially collimated beam 122, 222 of radiant electromagnetic energy by a plurality of linear prisms 109, 209 each one defining a plurality of prismatic features having a predetermined spacing $s_2$ to optimize the uniformity of the radiant electromagnetic energy redirected to the output surface 104, 204, wherein each prismatic feature comprises a first facet 110, 210 and a second facet 110, 210.

In one embodiment, emitting 210 comprises emitting an output beam 124, 224 of substantially collimated radiant electromagnetic energy from the output surface 104, 204 at a substantially normal angle relative to the output surface 104, 204.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "20 mm" is intended to mean "about 20 mm."

Although the a low profile backlight apparatus was illustrated and described herein as embodied in one or more specific examples, it is nevertheless not intended to be limited to the details shown. Various modifications and structural changes may be made therein without departing from the scope of the low profile backlight apparatus. Any modifications and structural changes are within the scope and range of equivalents of the claims. Accordingly, it is appropriate that the appended claims be construed broadly and in a manner consistent with the scope of the low profile backlight apparatus as set forth in the following claims.

What is claimed is:

1. A collimating waveguide, comprising:
   an input surface comprising a microstructure to receive radiant electromagnetic energy from a point source, wherein the microstructure comprises a plurality of linear prisms each one defining an apex angle, a convex portion defining a radius, and a concave portion defining a radius, wherein the radius of the convex portion is greater than the radius of the concave portion;
   an output surface to emit an output beam of substantially collimated radiant electromagnetic energy;

a first collimating surface to receive a beam of the radiant electromagnetic energy entering from the input surface traveling in a first direction and to reflect the radiant electromagnetic energy into a substantially collimated beam of radiant electromagnetic energy traveling in a second direction, which is the reverse of the first direction, wherein the first collimating surface comprises a curved surface, wherein the curved surface is defined by a first radius of curvature $R_1$ about a first axis and a second radius of curvature $R_2$ about a second axis, wherein the first and second axes are orthogonal; and a second collimating surface to receive the substantially collimated beam of radiant electromagnetic energy and to redirect the substantially collimated beam toward the output surface.

2. The collimating waveguide of claim 1, wherein the apex angle is about 80°, the radius of the convex portion is about 50 μm, and the radius of the concave portion is about 10 μm and wherein the plurality of linear prisms are spaced apart by a distance of about 0.1 mm.

3. The collimating waveguide of claim 1, wherein the microstructure of the input surface comprises an optically active input area of about 1.4 mm by about 3 mm.

4. The collimating waveguide of claim 1, wherein the output surface is substantially optically flat to minimize surface roughness.

5. The collimating waveguide of claim 1, wherein the output surface is a smooth total internal reflection (TIR) surface.

6. The collimating waveguide of claim 1, wherein the output surface has an aspect ratio of about 4:3.

7. The collimating waveguide of claim 6, wherein the output surface has an optically active area of about 15 mm by about 20 mm.

8. The collimating waveguide of claim 1, wherein the output surface has an aspect ratio of about 16:9.

9. The collimating waveguide of claim 1, wherein the curved surface is a spherical surface, wherein the first radius of curvature $R_1$ is equal to the second radius of curvature $R_2$.

10. The collimating waveguide of claim 9, wherein the spherical surface comprises a radius of curvature $R_1=R_2$ of about 55 mm.

11. The collimating waveguide of claim 1, wherein the second collimating surface comprises a microstructure.

12. The collimating waveguide of claim 11, wherein the microstructure comprises a plurality of linear prisms each one defining a plurality of prismatic features having a predetermined spacing to optimize the uniformity of the radiant electromagnetic energy redirected to the output surface, wherein each prismatic feature comprises a first facet and a second facet.

13. The collimating waveguide of claim 12, wherein the first facet forms a first angle relative to an axis substantially parallel to the output surface and the second facet forms a second angle relative to the axis, and wherein the first angle is less than the second angle.

14. The collimating waveguide of claim 13, wherein the spacing of the prismatic features is about 0.1 mm, the first angle is about 10°, and the second angle is about 37.5°.

15. The collimating waveguide of claim 1, wherein the first and second collimating surfaces are optically reflective surfaces.

16. The collimating waveguide of claim 15, wherein the optically reflective surfaces are made of a metallic material.

17. The collimating waveguide of claim 16, wherein the metallic material comprises aluminum.

18. The collimating waveguide of claim 1, wherein the output beam of substantially collimated radiant electromagnetic energy emitted from the output surface is substantially normal to the output surface.

19. The collimating waveguide of claim 1, wherein the input surface microstructure is to diverge the radiant electromagnetic energy received from the point source so as to uniformly fill an aperture defined by the first collimating surface with the radiant electromagnetic energy.

20. A collimating optical backlight, comprising:
a reflective cavity; and
a collimating waveguide located with the reflective cavity, wherein the collimating waveguide comprises:
an input surface comprising a microstructure to receive radiant electromagnetic energy from a point source, wherein the microstructure comprises a plurality of linear prisms each one defining an apex angle, a convex portion defining a radius, and a concave portion defining a radius, wherein the radius of the convex portion is greater than the radius of the concave portion;
an output surface to emit an output beam of substantially collimated radiant electromagnetic energy;
a first collimating surface to receive a beam of the radiant electromagnetic energy entering from the input surface traveling in a first direction and to reflect the radiant electromagnetic energy into a substantially collimated beam of radiant electromagnetic energy traveling in a second direction, which is the reverse of the first direction, wherein the first collimating surface comprises a curved surface, wherein the curved surface is defined by a first radius of curvature $R_1$ about a first axis and a second radius of curvature $R_2$ about a second axis, wherein the first and second axes are orthogonal; and
a second collimating surface to receive the substantially collimated beam of radiant electromagnetic energy and to redirect the substantially collimated beam toward the output surface.

21. The collimating optical backlight of claim 20, further comprising a source of radiant electromagnetic energy coupled to the input surface of the collimating waveguide.

22. The collimating optical backlight of claim 21, wherein the source of radiant electromagnetic energy is a light emitting diode (LED).

23. The collimating optical backlight of claim 20, comprising a diffuser located over the output surface of the collimating waveguide.

24. The collimating optical backlight of claim 23, wherein the diffuser comprises a holographic pattern.

25. The collimating optical backlight of claim 23, wherein the diffuser comprises a thin film micro-lens array.

26. The collimating optical backlight of claim 23, wherein the diffuser redirects the radiant electromagnetic energy from the output surface of the collimating waveguide to a narrow collimated and uniform angular field of view.

27. The collimating optical backlight of claim 26, wherein the angular field of view is about 10°.

28. The collimating optical backlight of claim 20, wherein the reflective cavity comprises a high efficiency white diffuse reflective material.

29. The collimating optical backlight of claim 20, wherein the input surface microstructure is to diverge the radiant electromagnetic energy received from the point source so as to uniformly fill an aperture defined by the first collimating surface with the radiant electromagnetic energy.

30. A method of producing a collimated beam of radiant electromagnetic energy, the method comprising:

optically coupling radiant electromagnetic energy from a point source into an input surface comprising a microstructure, wherein the microstructure comprises a plurality of linear prisms each one defining an apex angle, a convex portion defining a radius, and a concave portion defining a radius, wherein the radius of the convex portion is greater than the radius of the concave portion;

transmitting the radiant electromagnetic energy from the input surface to a first collimating surface in a first direction by reflection and total internal reflection (TIR);

reflecting the radiant electromagnetic energy by the first collimating surface into a substantially collimated beam of radiant electromagnetic energy traveling in a second direction, which is the reverse of the first direction, wherein the first collimating surface comprises a curved surface, wherein the curved surface is defined by a first radius of curvature $R_1$ about a first axis and a second radius of curvature $R_2$ about a second axis, wherein the first and second axes are orthogonal;

redirecting the substantially collimated beam of radiant electromagnetic energy by a second collimating surface into a substantially collimated beam toward an output surface; and emitting the substantially collimated beam of electromagnetic energy from the output surface.

31. The method of claim 30, comprising reflecting the optically coupled radiant electromagnetic energy by an internal surface of the output surface by total internal reflection (TIR).

32. The method of claim 30, wherein redirecting the substantially collimated beam of radiant electromagnetic energy by the second collimating surface comprising reflecting the substantially collimated beam of radiant electromagnetic energy by a plurality of linear prisms each one defining a plurality of prismatic features having a predetermined spacing to optimize the uniformity of the radiant electromagnetic energy redirected to the output surface, wherein each prismatic feature comprises a first facet and a second facet.

33. The method of claim 30, wherein emitting an output beam of substantially collimated radiant electromagnetic energy from the output surface, comprises emitting an output beam of substantially collimated radiant electromagnetic energy from the output surface at a substantially normal angle relative to the output surface.

34. The method of claim 30, comprising diverging by the input surface microstructure the radiant electromagnetic energy received from the point source and uniformly filling an aperture defined by the first collimating surface with the radiant electromagnetic energy.

* * * * *